Sept. 2, 1941.   P. H. KOCH   2,254,226
WATER TUBE STEAM BOILER
Filed June 22, 1938   4 Sheets-Sheet 2
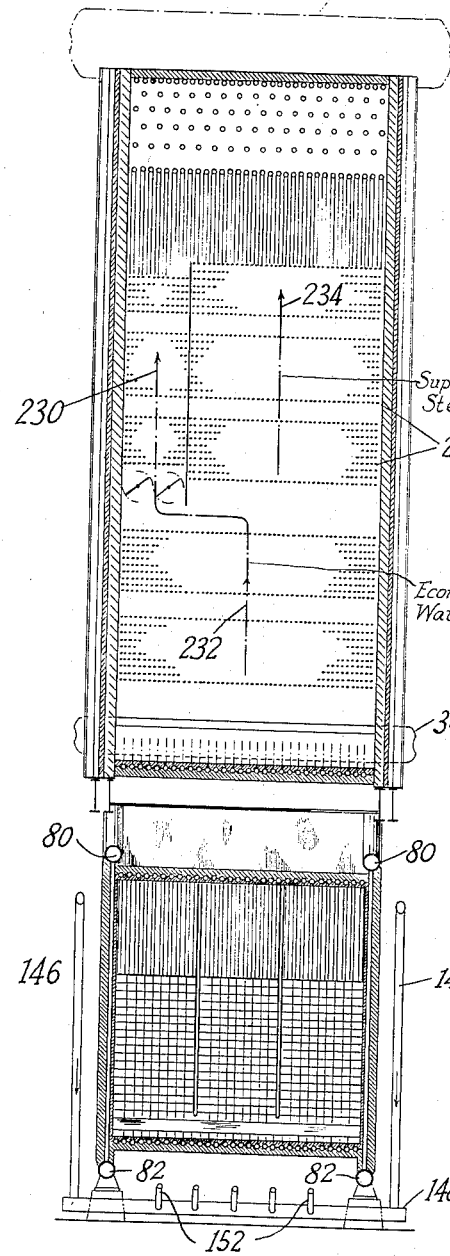
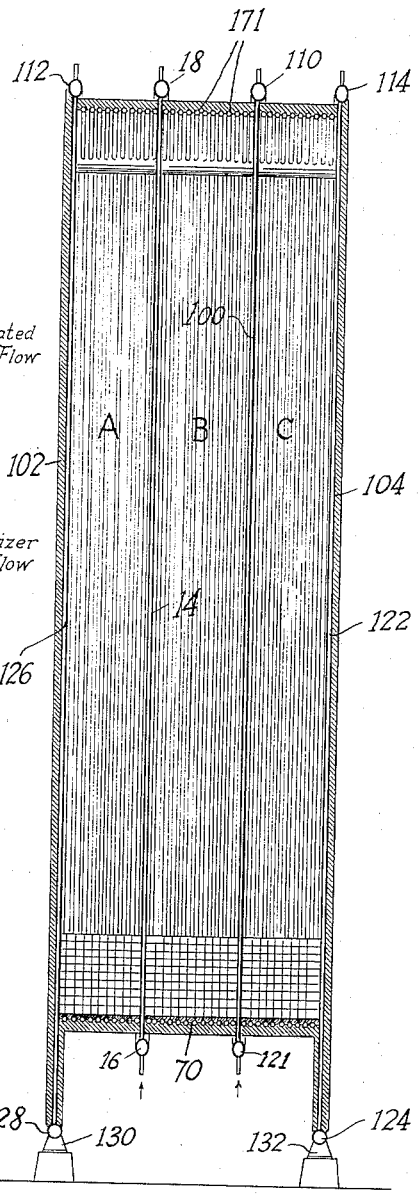
INVENTOR.
Paul H. Koch
BY
ATTORNEY.

Sept. 2, 1941.　　　　　P. H. KOCH　　　　　2,254,226
WATER TUBE STEAM BOILER
Filed June 22, 1938　　　　　4 Sheets-Sheet 3
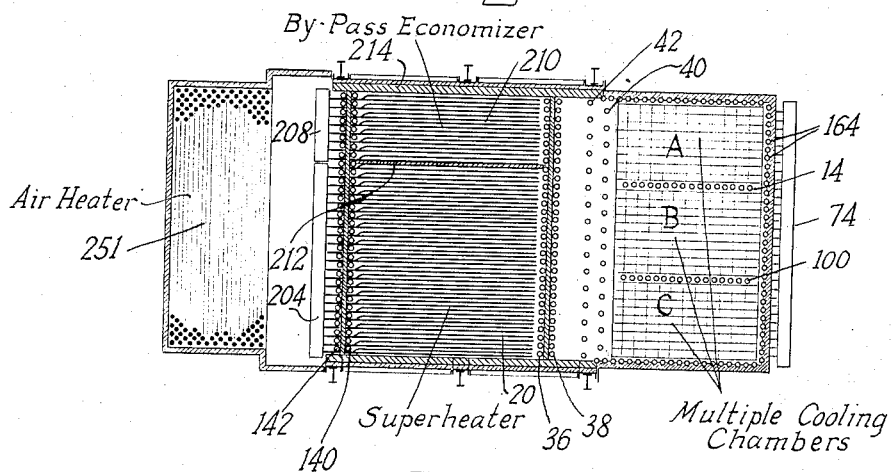
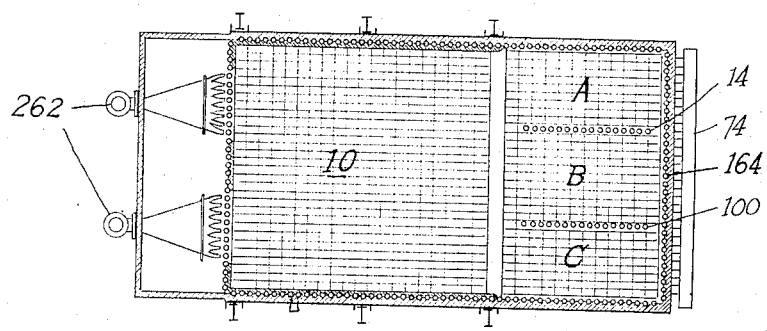
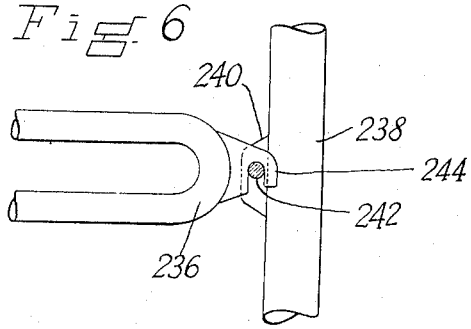
INVENTOR.
Paul H. Koch
ATTORNEY.

Sept. 2, 1941.  P. H. KOCH  2,254,226
WATER TUBE STEAM BOILER
Filed June 22, 1938    4 Sheets-Sheet 4

INVENTOR.
Paul H. Koch
BY
ATTORNEY.

Patented Sept. 2, 1941

2,254,226

UNITED STATES PATENT OFFICE 2,254,226

WATER TUBE STEAM BOILER

Paul H. Koch, Scotch Plains, N. J., assignor to The Babcock & Wilcox Company, Newark, N. J., a corporation of New Jersey Application June 22, 1938, Serial No. 215,122

9 Claims. (Cl. 122—235)

This invention relates to a steam boiler installation and particularly to the co-ordination of combustion and fluid heat exchange in apparatus capable of high rates of heat liberation and radiant heat absorption at large temperature differentials between the heat transmitting elements of combustion and the heat absorbing media.

An object of the invention is a novel multiple stage radiant boiler capable of producing economically large quantities of high pressure high temperature steam for the ultimate production of power. The boiler is characterized by its ability to burn a variety of fuels in suspension while effecting the separation of non-combustible residues of the fuel in such a manner that continuity of operation and thermal efficiency may be maintained over long periods.

A more limited object of the invention is a boiler with high rates of combustion maintained in a first furnace zone and high rates of heat absorption in a second furnace zone, the latter involving upright bare tube side walls and partition walls for reducing the temperature of the furnace gases and their suspended non-gaseous particles for contact with subsequent superheating surface. This reduction in temperature results in the chilling and congealing of noncombustible residues to an extent preventing their deleterious deposit on the superheating surface and facilitating their removal from the furnace.

Other objects of the invention will appear as the description proceeds.

The distinctions which characterize this invention are pointed out in the appended claims forming a part of this specification, but, for a better understanding of the invention reference should be made to the accompanying drawings and descriptive matter in which certain preferred embodiments of the invention are illustrated.

In the drawings:

Fig. 2 is a transverse vertical section taken on the section line 2—2 of Fig. 1;

Fig. 3 is a vertical section through the second furnace zone, taken on the section line 3—3 of Fig. 1;

Fig. 4 is a horizontal section through the second furnace zone, the superheater pass, and air heater on the section line 4—4 of Fig. 1;

Fig. 5 is a horizontal section through the high temperature furnace zone and the lower part of the second furnace zone, the position at which this view is taken being indicated by the broken section line 5—5 of Fig. 1;

Fig. 6 is a detail view in the nature of an elevation showing the manner in which the superheater and economizer coils are supported by upright tubes connected into the boiler circulation.

Figure 1:
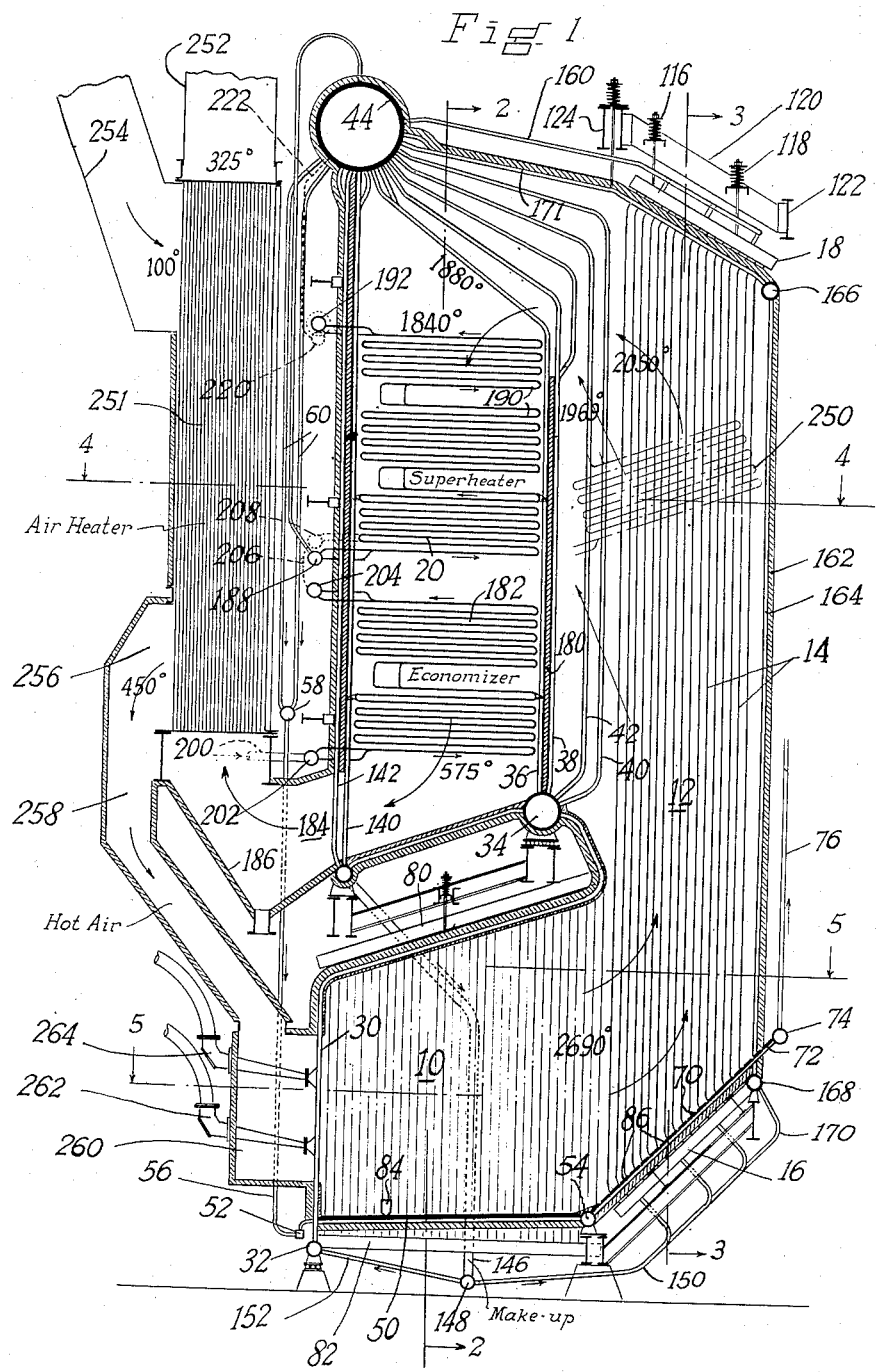
Fig. 1 is a vertical section of a high pressure and high temperature water tube stream boiler constructed in accordance with the teachings of this invention.

Fig. 1 of the drawings shows a radiant boiler wherein combustion and heat absorption for the vaporization of the working fluid will be developed in furnace zones each involving such co-ordination of furnace conditions and arrangement of heat absorbing surfaces that the ultimate desideratum of slag-free gases of proper temperature at the exit of the furnace will be attained. To this end the primary and major combustion of fuel is effected in the high temperature primary furnace zone 10 wherein the ash constituents of the fuel are fused and caused to coalesce while at the same time radiantly transmitting heat to the furnace walls.

Furnace gases from the high temperature zone 10 are divided as they pass to a second zone 12 in which the products of combustion are subjected to a temperature reduction by radiant transfer of heat to surfaces of a high degree of absorptivity. These surfaces are provided by wall tubes some of which define the limits of the second zone. Within these limits, other parts of the surfaces are provided by upright partition wall tubes 14 connected at their lower ends to the headers 16 and at their upper ends to the headers 18 and dividing the second furnace zone into a plurality of cooling chambers A, B, and C, as particularly indicated in Fig. 4 of the drawings. In these multiple cooling chambers of the second furnace zone the gaseous portions of the products of combustion, as well as any non-gaseous or molten residues will be reduced in temperature so that the gases will be at the proper temperature for contact with the superheating surfaces of the superheater indicated generally at 20. Also, in the second furnace zone the molten residues of combustion will be chilled and congealed to such an extent so that excessive accumulations of deposits on the superheater tubes will be prevented. This chilling and congealing action also causes these residues to be separated from the gases in the second furnace zone and to fall therethrough into zones of higher gas temperatures so that these residues may be again fused for removal with the molten slag on the floor of the high temperature stage 10.

The radiant boiler indicated in Fig. 1 of the drawings is essentially defined by steam generating wall tubes connected into boiler circulation, all of these wall tubes absorbing heat resulting from the combustion of the fuel utilized, but in order to accomplish the desired results by the use of this construction the specific arrangement and character of the heat absorbing surfaces in the first furnace zone 10 preferably differs from the arrangement and character of the heat absorbing surfaces of the second zone 12.

A result to be accomplished is to obtain and maintain high furnace temperatures in the first furnace zone 10 in order to accomplish rapid and complete combustion of the fuel as well as the further result of maintaining the ash released during combustion from an ash bearing fuel, such as pulverized coal, in such molten condition that it may be removed from the primary furnace either continuously or intermittently.

In the secondary furnace zone the object is to present increased cooling surfaces of a higher rate of heat absorptivity in order that the radiant heat from the gases and any non-gaseous particles in suspension in the gases may be effectively absorbed and the temperatures of these elements, and more particularly the non-gaseous particles, substantially reduced so that when such particles contact convection heating surfaces subsequent to the secondary furnace zone, which in this construction is the superheater, those particles will be at a temperature below their fusion temperature and will consequently be in a dry or non-sticky condition so that there will be a minimum of resulting accumulation of ash or slag over the convection surfaces.

Because of the difference between solid and gaseous radiation, the temperature of the non-gaseous particles in the gases can be lower than the temperature of the gases themselves. In the present invention, this knowledge is utilized by so providing the absorption surfaces of the secondary furnace zone 12 as to insure the temperature of the non-gaseous particles being below their fusion temperature when leaving this zone of the furnace, while at the same time the temperature of the gases will be such as to insure the production of high temperature steam by their subsequent contact with the tubes of the superheater 20. High convection heat transfer rates are promoted by arranging the tubes of the convection bank so that they are relatively closely spaced, and it is possible to utilize such closely spaced tubes in the convection bank only if the non-gaseous particles in suspension in the gases are in a non-adhesive condition. This invention permits such close spacing of the superheater tubes. If the non-gaseous particles in suspension in the gases are above their fusion temperature when they contact with the superheater tubes, they would accumulate on these tubes and form undesirable obstructions to gas flow with the result that heat absorption as well as the overall operating conditions would be inefficient. Such contingencies are avoided by this invention.

In the primary furnace zone indicated at 10, in one of the drawings, high rates of combustion and high temperatures prevail, these conditions being promoted by lining the combustion chamber of this furnace zone with ceramic refractory material so bonded to the tubes that it is maintained thereon as integral parts of the furnace walls. The bonding of this refractory material to the tubes is such that it effectively maintains the refractory even though its furnace face layer is continuously at high temperatures during the operation of the unit.

The walls of the first furnace zone 10 are preferably of the stud tube type. On the furnace sides of the wall tubes there are provided metallic studs welded to the tubes. The furnace lining, provided by the ceramic refractory material is preferably installed in a moldable condition and tamped over the tubes between the studs. Along the sides of the tubes opposite the refractory lining the tubes are covered with heat insulating material suitably tied to the tubes and preferably held in place by a sectional metallic casing.

In the installation illustrated in Fig. 1 of the drawings the first furnace zone 10 has its front wall and its roof defined by the wall tubes 30 connected at their lower ends to a header 32. They discharge steam and water into the upper header or drum 34 from which the risers 36 and 38 and the screen tubes 40 and 42 discharge steam and water into the drum 44. The tubes 40 and 42 extend across the path of the furnace gases at a position forwardly of the superheater 20 and act as screen tubes.

The floor of the primary furnace zone 10 is defined by the floor tubes 50 connected at their forward ends to the water supply header 52 and communicating with the header 54 at their opposite ends. Water is supplied to the header 52 by the downcomers 56 which are in communication with the water space of the drum 44 by the header 58 and the downcomer connections 60.

Beneath the second furnace zone 12 and exposed to the radiant heat of the first furnace zone 10 is a furnace floor 70 which slopes sharply downwardly toward the floor of the first furnace zone 10. This inclined floor 70 is defined by the inclined tubes 72 directly connecting the header 54 with the upper header 74 which may be connected to the drum 44 by the risers or discharge tubes 76.

The side walls of the high temperature furnace stage 10 are defined by wall tubes connecting the upper headers 80 to the lower headers 82 and these walls, as well as the floor of the primary furnace zone, are preferably of the stud tube and ceramic refractory structure above described. The furnace floor preferably slopes toward the slag outlet 84 through which slag is withdrawn from the furnace. The floor 70 inclined sharply toward the main floor of the high temperature zone 10 may be also of the stud tube and ceramic refractory construction, but, under some conditions, smooth faced metallic blocks 86 may be secured to the tubes 72 to provide a sloping floor along which molten ash particles pass downwardly toward the slag outlet 84.

The walls of the second furnace zone 12 present high heat absorbing surfaces to the furnace gases, either in the form of a "tube-to-tube" arrangement of steam generating wall tubes with their bare surfaces presented toward the furnace gases and with adjacent tubes essentially in contact in the planes of the boundaries of this furnace zone. The tubes defining the walls of the second furnace zone may also be a part of a so-called "partial stud tube" arrangement in which the tubes are spaced apart but the spaces between them and in the plane of a wall being closed against the passage of gases by studs or metallic extensions projecting therefrom. These studs bond ceramic refractory material to the tubes, that material being pressure molded or tamped around the studs between the tubes. Furthermore, in order to facilitate the removal of ash or molten slag that might be deposited or accumulated on the walls of the second furnace zone these walls are of such construction as to provide natural cleavage planes between wall surfaces and any such slag accumulations.

This arrangement will result in the slag naturally breaking away from the walls after it is accumulated to a point where its weight is greater than that which can be normally maintained. In the present construction such displaced slag accumulations will fall freely through the second furnace zone to the inclined floor 70. In this position they will be exposed to the high temperatures of the primary furnace zone 10 and to the influence of gases issuing from the first zone with the result that the slag will be fused so that it will flow along this wall and join the main body of molten slag at the base of the high temperature furnace stage and be thereafter removed through the slag discharge opening 84.

The multiple cooling chambers A, B, and C of the second furnace zone are divided by rows of vertically arranged cooling tubes, the chambers A and B being separated by the tubes 14 and the chambers B and C by the tubes 100. The arrangement of these tubes with reference to the walls 102 and 104 of the second furnace zone is indicated in Figs. 3 and 4 of the drawings, and Fig. 1 augments these disclosures in showing how these tubes are arranged and supported. The tubes 14 are secured at their upper ends to the header 18 and the tubes 100 are secured to a similar header 110. These headers, together with the upper side wall headers 112 and 114, are suspended by spring supports 116 and 118 from beams 120, 122, and 124. These supports have the effect of putting the wall tubes of the cooling chambers in suspension and thus maintaining them in their operative relationships relative to their division of the second furnace zone into a plurality of cooling chambers and this is true even though the lower headers 16 and 121 for the tubes 14 and 100 are maintained by supports at the base of the installation.

The tubes 14 and 100 dividing the multiple cooling chambers A, B, and C are indicated in Figs. 4 and 5 as being somewhat spaced, but it is to be understood that it is within the purview of the invention that they may be substantially in contact so as to form substantially closed division walls. When they are spaced, as indicated in the drawings, appropriate metallic lugs may be welded to the tubes at spaced intervals along their lengths to hold them in the desired relationship, or the tubes may be spaced apart but arranged with Bailey blocks or other metallic space closers to provide the extent and type of cooled surface desired. Along the side wall 104 of the second furnace zone, the wall tubes 122 are arranged. They connect the upper header 114 with the lower header 124 and similar tubes 126 are associated with the opposite wall 102 and its lower header 128. The latter and the header 124 are shown as mounted upon pedestals 130 and 132.

When the tubes 126 and 122 are arranged in spaced relationship, the spaces between these tubes may be closed by stud tube and refractory structures such as those above referred to. However, in some instances, the tubes 122 and 126 may be arranged to form "tube-to-tube" walls.

The manner in which the wall tubes of the second furnace zone are connected into the boiler circulation is indicated in Fig. 1 of the drawings. As here shown, the header 16 is in communication with the water spaces of the drum 44 by means of the downcomers 140 and 142, the header 144, the make-up connection 146, the header 148, and the circulating tubes 150. The latter tubes are shown as extending from one side of the header 148, while the tubes 152 extend from the other side of the header to the header 32 for supplying water to the wall tubes 30.

The secondary zone upper header 18 is connected to the steam and water drum 44 by the circulators 160 and similar connections may be provided for the remaining upper headers 110, 112, and 114.

The wall 162 of the second furnace zone includes wall tubes 164 communicating at their upper ends with the header 166 and connected at their lower ends to the header 168. The latter is supplied with water by the tubes 170 which are preferably connected to the make-up header 148. Steam and water are discharged from the header 166 into the drum 44 through the roof tubes 170.

Upon emerging from the second furnace zone, the furnace gases pass across a tubular furnace screen provided by the upper portions of the tubes 36, 38, 40, and 42, these tubes being connected into the boiler circulation by reason of their communication with the drums 34 and 44. Of these tubes, the tubes 36 and 38 support refractory material which forms the baffle 180. This baffle preferably extends upwardly from the header 34 and between rows of the tubes 36 and 38 to a point near the upper part of the second furnace zone, shielding the convection section of the boiler from radiant heat from the second zone and directing the furnace gases toward the screen tubes which extend across the entrance of the convection section.

In the illustrative installation, the convection section is formed by the spaced tubes of the superheater 20 and the economizer 182. The furnace gases flow downwardly in the convection section toward an outlet 184 adjacent the dust hopper 186 and steam from the drum 44 preferably flows upwardly from the superheater inlet header 188 and through the superheater tubes 190 to the superheater outlet header 192. From this header the superheated steam passes to a point of use. The superheater tubes are preferably arranged as return bend sections as clearly indicated in Fig. 1 of the drawings.

The economizer 182 shown in Fig. 1 of the drawings also operates on the counter-flow principle, receiving water through the inlet connection 200 and the inlet header 202. From this header the economizer tubes extend as return bend tubes back and forth across the gas pass of the convection section to the economizer outlet header 204. From this header connections 206 are provided to an inlet header 208 for the by-pass economizer 210 having return bend tubes extending across the superheater by-pass between the baffle 212 and the setting wall 214. These tubes discharge into an outlet header 220 which is in communication with the drum 44 by means of the tubes 222.

The flow of water through the main economizer section and the secondary economizer section in the superheater by-pass is indicated by the arrows 230 and 232 and the dotted lines connecting them, in Fig. 2 of the drawings. Similarly, the flow of steam through the superheater is indicated by the arrow 234. It will thus be seen that the economizer sections and the superheater operate upon counter-flow principles.

The manner in which the superheater tubes and the economizer tubes are supported is indicated in Fig. 6 of the drawings. In this figure, the return bend 236 is representative of any of the return bends of the economizer or the superheater, and the upright tube section 238 is representative of any of the upright tubes 36 or 140. The latter have lugs 240 welded thereto on their sides toward the economizer or superheater tubes, and these lugs are rigid with the pins or rods 242 which may extend from tube to tube and entirely across the wall defined by the tubes 36 or the tubes 140. The return bend is provided with a hooked lug 244 which is associated with the pin or rod 242 in the manner shown.

Fig. 1 of the drawings indicates a section 250 of superheater or economizer tubes in the process of removal. The tubular parts of this section are arranged as a flat coil which may be withdrawn between adjacent tubes 36 and 38 after a part of the refractory material of the baffle 180 has been removed. Similar removal of the refractory material 162 along the wall tubes 164 of the second zone permits the section 250 to be entirely removed from the installation and a new section put in place by reverse movements.

The furnace gases leave the primary zone 10 at temperatures which may be as high as 3,000° F., but in the particular installation indicated in Fig. 1 the temperature of the gas leaving the zone is indicated as 2690° F. They are cooled to a temperature of the order of 2,000° F. at the exit of the second furnace zone, and enter the superheater pass at a temperature between 1880° and 1840° F. They pass from the economizer at a temperature of about 575° F. and then pass over the tubes of the air heater 251 to the flue 252. The drawings indicate that the gases enter the flue at a temperature of about 325° F.

Air to support combustion enters the air heater through the inlet 254 at a temperature which may be of the order of 100° F., and passes from the air heater through the outlet 256 at a temperature of about 450° F. From that point it passes through the duct 258 to the secondary air chamber 260 through which the burners 262 and 264 extend.

The steam boiler drum 44 of the illustrative installation may be supported on a column or columns formed by the tubes 140 and 142, and the latter may be structurally tied together in groups to afford columns of sufficient strength.

Figure 7:
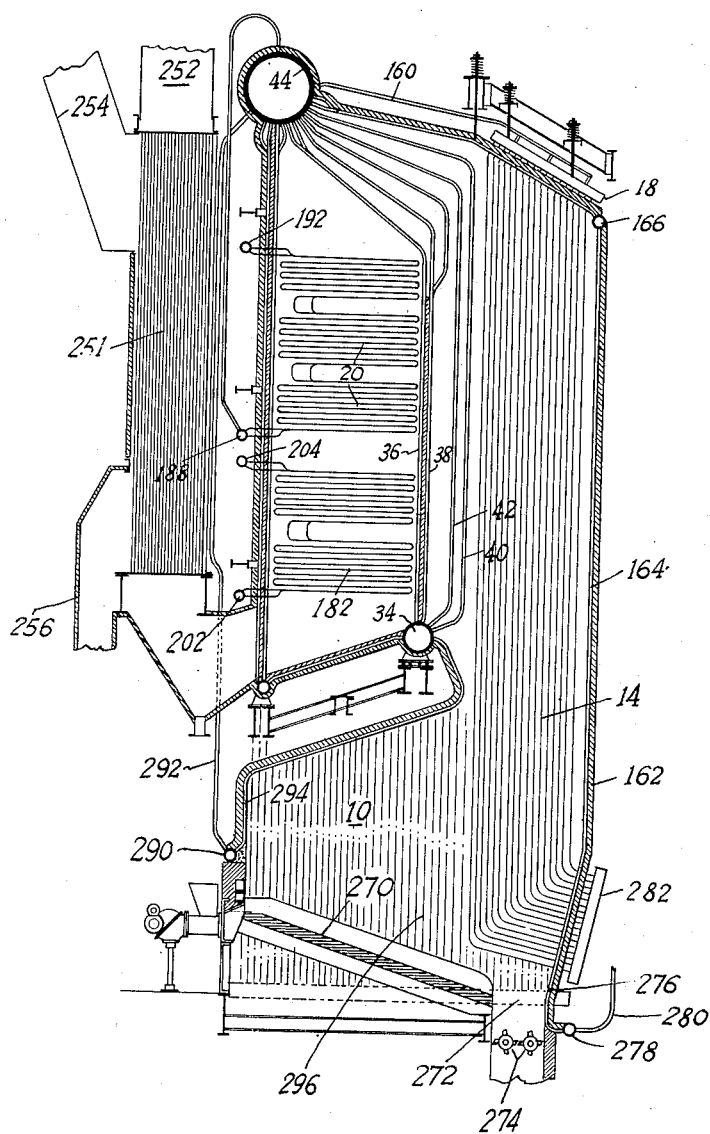
Fig. 7 is a view in the nature of a vertical section showing a modified form of the invention.

Fig. 7 shows an embodiment of the invention in which the furnace is fired by an underfeed stoker 270. This stoker discharges into an ash pit 272 at the base of the wall 162, the ash pit being provided with clinker grinders 274.

The downward continuation of the wall 162 adjacent the ash pit 272 is defined by the lower portions 276 of the wall tubes 164. These tube portions are connected to a header 278 which receives water from the circulatory system through the downcomers 280.

The partition walls defined by the tubes 14 of the second furnace zone have their lower ends bent toward the wall 162 so that they extend through the lower portion of this wall as shown in Fig. 7. These bent portions are connected to a header 282 which also has appropriate connection with the water space of the boiler system.

The Fig. 7 embodiment, above the first furnace zone 10, is substantially the same as the embodiment indicated in Fig. 1, but the presence of the stoker 272 necessitates changes in the front wall of the first furnace zone. These changes include the location of the header 290 above the stoker and the connection of this header with the water space of the drum 44 by downcomers 292. This header is connected with the intermediate drum 34 by the tubes 294 which define the front wall and the roof of the first furnace zone. The side walls of this zone are defined by wall tubes 296, connected into the boiler circulation in much the same manner as the corresponding wall tubes of the Fig. 1 embodiment.

Whereas the invention has been described with reference to the particular embodiment shown in the drawings, it is not limited thereto but is of such a scope as that indicated by the subjoined claims.

What is claimed is:

1. In apparatus of the class described, a radiant boiler in which tubes define the walls of the furnace combustion chamber of a first furnace zone, said walls presenting refractory furnace faces, a convection section including a high temperature superheater, means for burning fuel in suspension in the first zone, means in a second furnace zone including substantially unobstructed gas cooling chambers defined by fluid cooled tube walls having degrees of heat absorptivity so much higher than those of the walls of the first furnace zone that the temperature of the furnace gases and the suspended non-gaseous particles is so reduced that the tubes of the convection section will not be fouled by accumulations of those particles, said gas cooling chambers constituting gas passages arranged in parallel and interposed relative to the combustion chamber and the convection section so that the furnace gases are divided in their passage toward the convection section, and means connecting said tubes into the fluid system of the boiler, the gas inlet of the convection section being shielded from the radiant heat of the high temperature first furnace zone.

2. In a multiple stage radiant boiler, a primary zone including a high temperature combustion chamber having walls defined by steam generating tubes, the combustion chamber walls presenting refractory furnace faces, a convection section including a superheater having spaced tubes over which the furnace gases pass, a second zone divided into a plurality of substantially unobstructed furnace cooling chambers defined by fluid cooled tube walls presenting furnace faces of degrees of heat absorptivity higher than those of the walls of the primary zone, said gas cooling chambers constituting gas passages arranged in parallel and interposed relative to the combustion chamber and the convection section so that the furnace gases are divided in their passage toward the convection section, and means connecting said tubes into the fluid system of the boiler, the primary zone and the convection section being disposed at the same side of the second zone with the furnace gas outlet of the primary zone below the gas inlet of the convection section.

3. In a multiple stage radiant boiler, a primary zone including a high temperature combustion chamber defined by wall tubes connected into the boiler circulation, the walls of the combustion chamber presenting refractory furnace faces, a high temperature superheater, means burning fuel in suspension in the primary zone, a secondary zone including a furnace chamber defined by tubes, and division walls formed by tubes extending through the furnace chamber to afford additional heat absorptive surfaces in the second zone, and means connecting said tubes into the boiler circulation, said division walls having degrees of heat absorptivity higher than those of the primary zone and being so associated with the remaining walls of the second zone that there are provided a plurality of gas flow paths leading in parallel from the primary zone to the gas outlet of the second zone, the division walls affording high degrees of heat adsorption without imposing any substantial increase in draft loss in the secondary zone.

4. In a multiple stage radiant boiler capable of producing high pressure and high temperature steam, the walls of the combustion chamber presenting refractory furnace faces, tubes defining the walls of a combustion chamber of the primary furnace zone wherein combustion is effected at temperatures sufficiently high to provide for the successful use of a wide range of fuels with minimum carbon losses over wide ranges of boiler load variation, a convection section including a superheater having spaced tubes over which the furnace gases pass, the convection section being disposed above the said combustion chamber with the tube defined roof of the latter disposed between the convection section and the primary zone, a second zone including substantially unobstructed gas cooling furnace chambers defined by tube walls of degrees of heat absorptivity higher than those of the combustion chamber of the primary furnace zone, said gas cooling chambers constituting gas passages arranged in parallel and interposed relative to the combustion chamber and the convection section so that the furnace gases are divided in their passage toward the convection section, said second zone connecting the gas outlet of the primary zone and the gas inlet of the convection section, and means for connecting said wall tubes into the boiler circulation.

5. In a radiant boiler of the type including a small volume high temperature primary furnace chamber in which high ignition and combustion temperatures are maintained, a large volume secondary furnace chamber for radiant heat absorption receiving furnace gases from the primary chamber, a superheater, upright fluid conducting tubes forming a superheater screen, and an economizer; the combination therewith of a primary furnace chamber lining consisting of ceramic refractory material maintained in a state of incandescence to promote high ignition and combustion temperatures, water tubes defining the walls of the primary chamber and connected into the boiler circulation so as to protect and maintain the ceramic refractory lining, fluid cooled tubes defining the walls of the secondary chamber and presenting wide areas of fluid cooled surfaces absorbing heat from the furnace gases and their suspended solids and also causing separation of the solids and cooling of the furnace gases below temperatures at which the superheater tubes will be damaged, the walls of the secondary chamber having degrees of heat absorptivity greater than those of the primary chamber, the secondary chamber opening out from the primary chamber and allowing the furnace gases a sufficient length of travel and a sufficient time interval to substantially complete the cooling of the furnace gases, the superheater consisting of spaced tubes, means for supporting the superheater in such a position that it will not be exposed directly to the intense radiant heat of the primary chamber, and other fluid cooled tubes dividing the secondary chamber into a plurality of gas cooling chambers constituting gas passages arranged in parallel and interposed relative to the superheater and the primary furnace chamber so that the furnace gases are divided in their passage toward the superheater.

6. In a high temperature high capacity steam generator, a furnace including a high temperature primary combustion chamber and ignition section and a relatively low temperature secondary furnace chamber of large volume, the secondary chamber receiving furnace gases and combustion elements from the primary combustion chamber, means for burning fuel in the furnace and maintaining the temperature of the primary combustion chamber at a high value above the fusion point of the ash, the primary combustion chamber having its walls defined by water tubes supporting a refractory lining, wall tubes for the secondary chamber presenting large areas of fluid cooled metal lining that chamber to absorb heat from the furnace gases at rates higher than those of the walls of the primary combustion chamber, a convection section disposed laterally of the secondary chamber and including furnace tubes disposed across the path of furnace gases, and other fluid cooled tubes dividing the secondary chamber into a plurality of gas cooling chambers constituting gas passages arranged in parallel and interposed relative to the convection section and the primary combustion chamber so that the furnace gases are divided in their passage toward the superheater.

7. In a multiple stage radiant vapor generator including a primary zone having a combustion chamber in which a slag-forming fuel is burned at high temperatures, a convection section, fluid conducting tubes arranged as walls in a radiant heat absorption zone and defining a plurality of separate second zone sub-chambers each of which connects the combustion chamber and convection section so that the furnace gases from the former are divided in their passage from the combustion chamber to the convection section, each of said sub-chambers presenting along its walls large areas of fluid cooled surfaces absorbing heat at high rates from the furnace gases and their suspended solids and allowing the furnace gases a sufficient length of travel and a sufficient time interval in the radiant heat absorption zone to effect cooling of the furnace gases to temperatures below the fusion temperatures of solids suspended therein, and means connecting said tubes into the fluid system of the generator.

8. In a steam generating unit, steam generating furnace wall tubes defining a combustion chamber, fuel burning means operatively associated therewith, said means effecting such combustion that solids are suspended in the furnace gases in the combustion chamber, a convection section including steam generating tubes extending across its furnace gas inlet, a plurality of spaced partition walls defined by fluid conducting tubes exposed to the heat of the furnace gases in the zone between said combustion chamber and the convection section inlet, the partition wall tubes separating gas passages arranged in parallel between the combustion chamber and the convection section, the partition walls also being arranged in rows transversely related to said inlet, and a fluid cooled floor beneath the partition walls to receive solids deposited from the furnace gases in the zone of the partition walls.

9. A steam generator comprising a furnace chamber having a floor constructed to receive a layer of molten slag, means forming a slag outlet from the lower part of said furnace chamber, means for burning a slag forming fuel in suspension in said furnace chamber at furnace temperatures above the fuel ash fusion temperature, a convection section in which spaced tubes are subjected to furnace gases from said furnace chamber, means forming a relatively narrow and elongated gas passage disposed between and serially connecting said furnace chamber and the convection section, said gas passage being of a length at least several times greater than its breadth, and transversely spaced groups of fluid heating tubes extending longitudinally of said gas passage and arranged to divide said passage into a plurality of unobstructed fluid cooled gas flow channels leading from the outlet of the furnace chamber to the inlet of the convection section.

PAUL H. KOCH.

CERTIFICATE OF CORRECTION.

Patent No. 2,254,226.  September 2, 1941.

PAUL H. KOCH.

It is hereby certified that error appears in the printed specification of the above numbered patent requiring correction as follows: Page 5, first column, lines 22 and 23, claim 4, strike out "the walls of the combustion chamber presenting refractory furnace faces," and insert the same after "variation," in line 29, same claim; and that the said Letters Patent should be read with this correction therein that the same may conform to the record of the case in the Patent Office.

Signed and sealed this 21st day of April, A. D. 1942.

(Seal)

Henry Van Arsdale,
Acting Commissioner of Patents.